US011366368B1

(12) United States Patent
Li

(10) Patent No.: US 11,366,368 B1
(45) Date of Patent: Jun. 21, 2022

(54) DISPLAY PANEL AND ELECTRONIC DEVICE

(71) Applicant: Wuhan China Star Optoelectronics Technology Co., LTD., Wuhan (CN)

(72) Inventor: Xueyun Li, Wuhan (CN)

(73) Assignee: Wuhan China Star Optoelectronic Technology Co., Ltd., Wuhan (CN)

( * ) Notice: Subject to any disclaimer, the term of this patent is extended or adjusted under 35 U.S.C. 154(b) by 0 days.

(21) Appl. No.: 16/651,250

(22) PCT Filed: Jan. 2, 2020

(86) PCT No.: PCT/CN2020/070141
§ 371 (c)(1),
(2) Date: Mar. 26, 2020

(87) PCT Pub. No.: WO2021/056924
PCT Pub. Date: Apr. 1, 2021

(30) Foreign Application Priority Data

Sep. 23, 2019 (CN) ......................... 201910901190.7

(51) Int. Cl.
*G02F 1/137* (2006.01)
*G02F 1/1335* (2006.01)
*G02F 1/1343* (2006.01)

(52) U.S. Cl.
CPC ........ *G02F 1/137* (2013.01); *G02F 1/133512* (2013.01); *G02F 1/133514* (2013.01); *G02F 1/133528* (2013.01); *G02F 1/134309* (2013.01)

(58) Field of Classification Search
CPC ...................................................... G02F 1/137
See application file for complete search history.

(56) References Cited

U.S. PATENT DOCUMENTS

| | | | |
|---|---|---|---|
| 2016/0147091 | A1 | 5/2016 | Christmann et al. |
| 2019/0384121 | A1* | 12/2019 | Nishiwaki ......... G02F 1/133528 |

FOREIGN PATENT DOCUMENTS

| | | | |
|---|---|---|---|
| CN | 101169491 | A | 4/2008 |
| CN | 201622507 | U | 11/2010 |
| CN | 105093580 | A | 11/2015 |
| CN | 207867193 | U | 9/2018 |
| CN | 109283736 | A | 1/2019 |
| CN | 109828402 | A | 5/2019 |
| CN | 209072601 | U | 7/2019 |
| CN | 110187559 | A | 8/2019 |
| JP | 2010223996 | A | 10/2010 |

* cited by examiner

*Primary Examiner* — Edmond C Lau
(74) *Attorney, Agent, or Firm* — Lowenstein Sandler LLP

(57) ABSTRACT

A display panel and an electronic device are provided. The display panel includes a display region and a non-display region. The first polarizer is provided with a first through hole, and the second polarizer is provided with a second through hole. A switchable module is located between the first through hole and the second through hole, and includes an on state and an off state to control light entering the display panel. The display panel provided manually controls whether the electronic device performs an image capturing action, thereby ensuring security and protecting privacy.

20 Claims, 1 Drawing Sheet

120
1201
21
1401
130
20
1402
121
150
1211

DISPLAY PANEL AND ELECTRONIC DEVICE

FIELD OF INVENTION

The present disclosure relates to a technical field of displays, and particularly to a display panel and an electronic device.

BACKGROUND OF DISCLOSURE

Liquid crystal displays have been widely used in people's lives, such as display screens for mobile phones, computers, TVs, etc. With the development of display technology and the people's requirements for the advancement of display technology, narrow bezel liquid crystal displays (LCD) and full-screen LCD displays have been applied to terminal applications, such as mobile phones, notebooks, etc.

Blind hole displays employ a method greatly increasing screen-body ratios of mobile phones, tablets, notebooks and other applications. The same types of liquid crystals are located in the blind hole and in the display region. The difference is that the liquid crystals at the position of the blind hole do not display but only fill the blind hole. A through hole is formed on both sides of polarizers (POL). To facilitate light transmission, a lens is located on the back side of the through hole. The lens receives light entering the blind hole for operations, such as capturing images. However, this type of blind hole arrangement is not conducive to the security of the application terminal. For example, when the user is doing a private activity, such as taking a bath, having a conference, etc., the lens of the application terminal may be remotely controlled by a hacker to take pictures.

SUMMARY OF INVENTION

A conventional blind hole display is easy for a hacker to remotely turn on the lens to take pictures, thereby leaking privacy. The present disclosure provides a display panel and an electronic device.

To solve the above problems, in a first aspect, the present disclosure provides a display panel including a display region and a non-display region, wherein the display panel further includes:

polarizers including a first polarizer and a second polarizer, wherein the first polarizer and the second polarizer are opposite each other, and the first polarizer is provided with a first through hole, and the second polarizer is provided with a second through hole, the first through hole corresponds to the second through hole, and the first through hole and the second through hole are located in the non-display region; and a switchable module located between the first through hole and the second through hole, including an on state and an off state, and being switchable between the on state and the off state to control light entering the display panel.

Furthermore, the display panel further comprises:

a color filter substrate disposed below the first polarizer; and an array substrate disposed on the second polarizer, and disposed opposite the color filter substrate.

Furthermore, the display panel includes a control module configured for controlling switching of the switchable module between the on state and the off state by controlling a voltage across the switchable module.

Furthermore, the control module includes a first electrode and a second electrode, the first electrode is disposed opposite the second electrode, the first electrode is disposed on the color filter substrate, and the second electrode is disposed on the array substrate.

Furthermore, the display panel further includes a liquid crystal region located between the first polarizer and the second polarizer, and including a first liquid crystal region and a second liquid crystal region, wherein the second liquid crystal region is surrounded by a frame adhesive, and is separated from the first liquid crystal region by the frame adhesive.

Furthermore, the second liquid crystal region is located directly below the first through hole, and disposed to correspond to the first through hole.

Furthermore, the switchable module is disposed in the second liquid crystal region.

Furthermore, an area of the second liquid crystal region is greater than or equal to an area of the first through hole.

Furthermore, the switchable module is a light-scattering liquid crystal.

Furthermore, material for the light-scattering liquid crystal is mixed material of a polymer and a liquid crystal formed by photocuring.

Furthermore, the display panel further includes a shielding sheet which blocks the first through hole and is movably disposed above the first through hole to control the light entering the display panel.

Furthermore, the shielding sheet is provided with a magnetic conductive portion, a magnet is located on a side of the display panel where the first through hole is located, and the magnet is connected with the shielding sheet by attracting the magnetic conductive portion.

In a second aspect, the present disclosure further provides an electronic device, including:

a device body including a display panel including a display region and a non-display region, wherein the display panel further includes:

polarizers including a first polarizer and a second polarizer, wherein the first polarizer and the second polarizer are opposite each other, and the first polarizer is provided with a first through hole, and the second polarizer is provided with a second through hole, the first through hole corresponds to the second through hole, and the first through hole and the second through hole are located in the non-display region;

a switchable module located between the first through hole and the second through hole, including an on state and an off state, and being switchable between the on state and the off state to control light entering the display panel;

a control module configured for controlling switching of the switchable module between the on state and the off state; and a camera module disposed directly below the second through hole and configured for capturing an image in the on state of the switchable module.

Furthermore, the display panel further includes:

a color filter substrate disposed below the first polarizer; and an array substrate disposed on the second polarizer, and disposed opposite the color filter substrate.

Furthermore, the display panel further includes the control module configured for controlling switching of the switchable module between the on state and the off state by controlling a voltage across the switchable module.

Furthermore, the control module includes a first electrode and a second electrode, the first electrode is disposed opposite the second electrode, the first electrode is disposed on the color filter substrate, and the second electrode is disposed on the array substrate.

Furthermore, the display panel further includes a liquid crystal region located between the first polarizer and the second polarizer, and including a first liquid crystal region and a second liquid crystal region, wherein the second liquid crystal region is surrounded by a frame adhesive, and is separated from the first liquid crystal region by the frame adhesive.

Furthermore, the second liquid crystal region is located directly below the first through hole, and disposed to correspond to the first through hole.

Furthermore, the switchable module is disposed in the second liquid crystal region.

Furthermore, an area of the second liquid crystal region is greater than or equal to an area of the first through hole.

Furthermore, the switchable module is a light-scattering liquid crystal.

Furthermore, material for the light-scattering liquid crystal is mixed material of a polymer and a liquid crystal formed by photocuring.

Beneficial effect: In the display panel and the electronic device provided by the embodiments of the present disclosure, a switchable module is disposed at the corresponding position of the blind hole in the display panel, so that the switchable module can be turned on or off by manual control. When the switchable module is turned on or off, external ambient light can reach the lens through the blind hole or be blocked, thereby manually controlling whether the electronic device performs image capturing actions, thereby ensuring security and protecting privacy.

BRIEF DESCRIPTION OF DRAWINGS

In order to more clearly illustrate the embodiments of the present disclosure or the technical solutions in prior arts, the following briefly introduces the accompanying drawings used in the embodiments. Obviously, the drawings in the following description merely show some of the embodiments of the present disclosure. As regards one of ordinary skill in the art, other drawings can be obtained in accordance with these accompanying drawings without making inventiveness efforts.

DETAILED DESCRIPTION OF PREFERRED EMBODIMENTS

Figure 1:
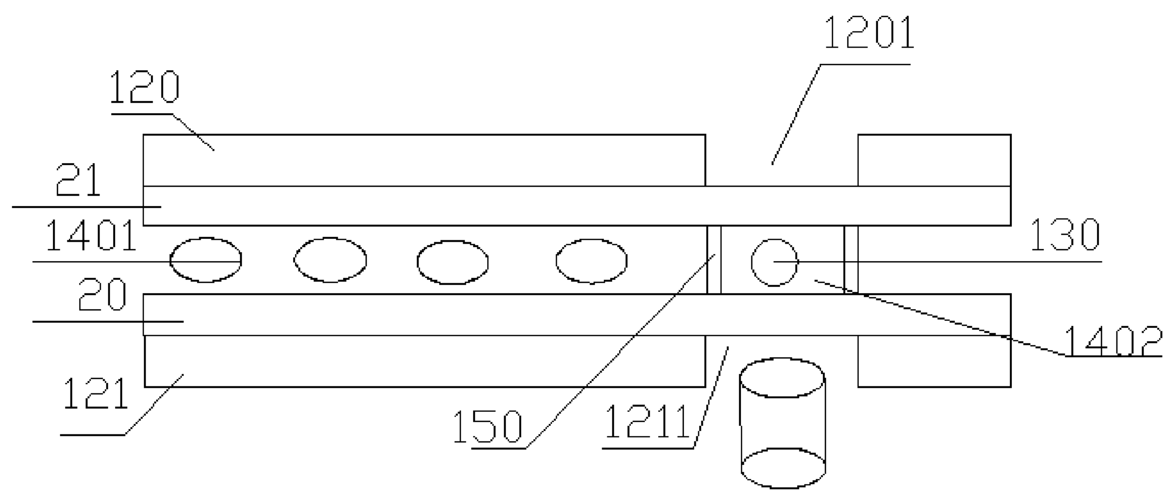
FIG. 1 is a side view of an embodiment of a display panel provided by the present disclosure.

The technical solutions in the embodiments of the present disclosure are clearly and completely described as follows with reference to the accompanying drawings in the embodiments. It is apparent that the described embodiments are only a part of the embodiments of the present disclosure, and not all of the embodiments. All other embodiments obtained by a person skilled in the art based on the embodiments of the present disclosure without inventive efforts are within the scope of the present disclosure.

In the description of the present disclosure, it is to be understood that the oriental and the positional relationships of the terms “center”, “longitudinal”, “transverse”, “length”, “width”, “thickness”, “upper”, “lower”, “front”, “rear”, “left”, “right”, “vertical”, “horizontal”, “top”, “bottom”, “inside”, “outside”, etc. are based upon the oriental or positional relationship shown in the drawings, are merely for facilitating and simplifying the description of the present disclosure, and do not indicate or imply that the device or components referred to have a specific orientation, and are constructed and operated in a specific orientation. Therefore, it should not be construed as limiting the disclosure. Moreover, the terms “first” and “second” are used for descriptive purposes only and are not to be construed as indicating or implying a relative importance or implicitly indicating the number of indicated technical features. Thus, features defining “first” or “second” may include one or more of the described features either explicitly or implicitly. In the description of the present disclosure, the meaning of “a plurality of” is two or more unless specifically defined otherwise.

In this application, the term “exemplary” is used to mean “serving as an example, illustration, or demonstration.” Any embodiment described as “exemplary” in this application is not necessarily to be construed as preferred or advantageous over other embodiments. In order to enable any person skilled in the art to implement and use the present disclosure, the following description is given. In the following description, details are set forth for the purpose of explanation. It should be understood by those of ordinary skill in the art that the present disclosure may be implemented without the use of these specific details. In other instances, well-known structures and procedures is not described in detail to avoid obscuring the description of the present disclosure with unnecessary details. Accordingly, the disclosure is not intended to be limited to the embodiments as shown, but is to be accorded the widest scope consistent with the principles and features disclosed herein.

Embodiments of the present disclosure provide a display panel and an electronic device, each of which will be described in detail below.

As shown in FIG. 1, it is a side view of an embodiment of a display panel provided by the present disclosure. The display panel includes a display area and a non-display area. The display panel further includes the following elements:

Polarizers includes a first polarizer and a second polarizer. The first polarizer and the second polarizer are opposite each other, and the first polarizer is provided with a first through hole, and the second polarizer is provided with a second through hole, the first through hole corresponds to the second through hole, and the first through hole and the second through hole are located in the non-display region; and A switchable module is located between the first through hole and the second through hole, the switchable module includes an on state and an off state, and the switchable module is switchable between the on state and the off state to control light entering the display panel.

In the display panel provided by the present disclosure, a switchable module is disposed at the corresponding position of the blind hole in the display panel, so that the switchable module can be turned on or off by manual control. When the switchable module is turned on or off, external ambient light can reach the lens through the blind hole or be blocked, thereby manually controlling whether the electronic device performs image capturing actions, thereby ensuring security and protecting privacy.

Specifically, the display panel 10 includes a first polarizer 120 and a second polarizer 121, the first polarizer 120 and the second polarizer 121 are oppositely disposed, the first polarizer is provided with a first through hole 1201, and the second polarizer is provided with a second through hole 1211. The positions of the first through hole 1201 and the second through hole 1211 are correspondingly arranged. The first through hole 1201 and the second through hole 1211 are located in a non-display region. An area S2 of the second through hole 1211 may be greater than or equal to an area S1 of the first through hole 1201, namely S2>S1, or S1=S2.

The display panel 10 further includes a switchable module 130 located between the first through hole 1201 and the second through hole 1211 in the display panel. The switchable module 130 includes an on state and an off state. The switchable module 130 is switchable between the on state and the off state. When the switchable module 130 is in the on state, light from the outside can enter the display panel through the first through hole 1201, the switchable module 130 and the second through hole 1211. When the switchable module 130 is in the off state, the light from the outside after entering the first through hole 1201 is blocked and cannot enter the inside of the display panel, due to the switchable module 130 in the off state.

In other embodiments of the present disclosure, when the switchable module 130 is in the on state, the light from the outside is blocked, and cannot enter the display panel. The image capturing function cannot be achieved, and privacy is protected. In contrast, when the switchable module 130 is in the off state, the light from the outside can pass through the first through hole 1201, and the switchable module 130 and the second through hole 1211, and enter the inside of the display panel.

Based on the above embodiment, the switchable module 130 between the on state and the off state is controlled by a control module, so that the switchable module 130 switches between the on state and the off state. The control module is located in the display panel. By controlling the voltage across the switchable module 130, the switchable module 130 is controlled to turn on or off.

In one embodiment of the present disclosure, the control module controlling the switchable module 130 to switch between the on state and the off state includes a first electrode and a second electrode, and the first electrode and the second electrode are transparent electrodes. The first electrode is disposed on a color film substrate 21 of the display panel and is bonded to the color film substrate 21. The second electrode is disposed on an array substrate 20 of the display panel and is bonded to the array substrate 20. The first electrode and the second electrode are oppositely disposed. The first electrode and the second electrode are configured to apply a voltage to the switchable module 130, so that the switchable module 130 switches between the on state and the off state.

In other embodiments of the present disclosure, the control module may also be located in a processor of the electronic device provided by the embodiment of the present disclosure.

Based on the above embodiments, the display panel provided by the present disclosure further includes a liquid crystal region 140, and the liquid crystal region 140 is located between the first polarizer 120 and the second polarizer 121. The liquid crystal region 140 is further divided into a first liquid crystal region 1401 and a second liquid crystal region 1402, wherein the second liquid crystal region 1402 is surrounded by a frame adhesive 150, and the second liquid crystal region 1402 is separated from the first liquid crystal region by the frame adhesive 150. The second liquid crystal region 1402 is located directly below the first through hole 1201 and directly above the second through hole 1211. A position of the second liquid crystal region 1402 corresponds to positions of the first through hole 1201 and the second through hole 1211.

In a specific embodiment of the present disclosure, when the area S2 of the second through hole 1211 is equal to the area S1 of the first through hole 1201, an area S3 of the second liquid crystal region 1402 may be equal to the area S1 of the first through hole 1201. At this time, the areas of the first through hole 1201, the second through hole 1211, and the second liquid crystal region 1402 are equal. The area S3 of the second liquid crystal region 1402 may also be larger than the area S1 of the first through hole 1201.

In another embodiment of the present disclosure, when the area S2 of the second through hole 1211 is larger than the area S1 of the first through hole 1201, the relationship of the three areas of the first through hole 1201, the second through hole 1211, and the second liquid crystal region 1402 may be: S1=S3<S2, or S1<S2=S3. When the area S3 of the second liquid crystal region 1402 is smaller than or equal to the area S2 of the second through hole 1211, the light entering the second liquid crystal region can completely enter the second through hole 1211 and then enter the display panel 10, so that the image capturing effect is effectively achieved.

Based on the above embodiment, in a specific embodiment of the present disclosure, the switchable module 130 may be located in the second liquid crystal region 1402, and the switchable module 130 is separated from the first liquid crystal region 1401 by the frame adhesive 150. When the switchable module is in the off state, the light from the outside pass through the first through hole 1201 and enters the second liquid crystal region 1402. Due to the switchable module 130 in the second liquid crystal 1402 in the off state, the light cannot pass through the switchable module 130, the image capturing function cannot be achieved, and privacy is protected.

In other embodiments of the present disclosure, when the switchable module 130 is in the on state, the light from the outside is blocked, and cannot enter the display panel. The image capturing function cannot be achieved, and privacy is protected. In contrast, when the switchable module 130 is in the off state, the light from the outside can pass through the first through hole 1201, the switchable module 130 and the second through hole 1211, and enter the inside of the display panel.

In a specific embodiment of the present disclosure, the switchable module 130 may be a light scattering liquid crystal, and the light scattering liquid crystal includes a transmission state and a scattering state. When the voltage is applied to the light scattering liquid crystal, the light scattering liquid crystal is in the transmission state, and the light from the outside can pass through the light scattering liquid crystal. When no voltage is applied to two ends of the light scattering liquid crystal, the light scattering liquid crystal is in the scattering state, and the light from the outside is scattered and cannot reach the second through hole 1211. The voltage across the light scattering liquid crystal can be controlled by the first electrode disposed on the color filter substrate 21 and the second electrode disposed on the array substrate 20, so as to control the light scattering liquid crystal to switch between the transmission state and the scattering state.

On the basis of the above embodiments, the liquid crystal scattering material may be a polymer formed from photocurable monomers scattered in the liquid crystal material. The polymer compound refers to a compound having a relative molecular mass of several thousand to several millions. Most of the polymer compounds are a mixture of many homologues with different relative molecular masses. Therefore, the relative molecular mass of the polymer compound is an average relative molecular weight. In the embodiment of the present disclosure, the polymer formed from the photo-curable monomer may be photo-curable resin molecules.

In other embodiments of the present disclosure, the display panel 10 may further include a shielding sheet, and the shielding sheet is movably disposed above the first through hole 1201 for blocking the first through hole 1201 to control the light from the outside to enter the first through hole 1201. The shielding sheet may also be located below the first through hole 1201 or between the first through hole 1201 and the second through hole 1211. The shape of the shielding sheet may be circular, square or oval. The shield may be made of plastic.

Furthermore, the shielding sheet is further provided with a magnetic conductive portion, which is made of a magnetic material. For example, the magnetic conductive portion is made of a metal containing iron, cobalt, and nickel. In the display panel, a magnet is disposed on a side where the first through hole 1201 is located, and the magnet is connected with the shielding sheet by attracting the magnetic conductive portion.

When performing operations, such as capturing images, is not needed, the shielding sheet can be rotated, so that the shielding sheet covers the first through hole 1201 and blocks the light from the outside from entering the first through hole 1201.

On the basis of the above embodiment, the display panel 10 further includes a fixing member. When the shielding sheet covers the first through hole 1201, the fixing member fixes the shielding sheet, and prevents a position of the shielding sheet from being changed when the shielding sheet is affected by external impacts, thereby ensuring that the shielding sheet can accurately cover the first through hole 1201.

It should be noted that the above embodiments of the display panels are only used for describing the above structures. It can be understood that, in addition to the above structures, the display panel in accordance with the embodiment of the present disclosure may also include any other necessary structures as needed, such as a substrate, a buffer layer, an interlayer dielectric layer (ILD), etc., and is not specifically limited thereto.

Figure 2:
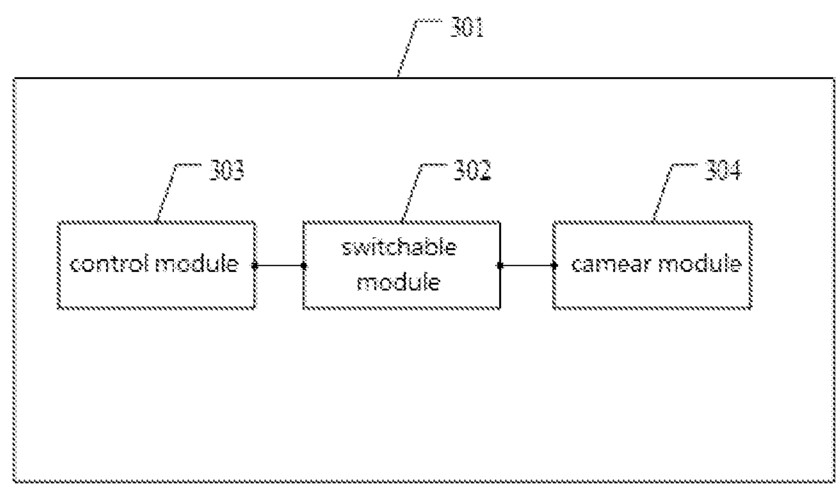
FIG. 2 is a schematic diagram of an embodiment of an electronic device provided by the present disclosure.

The present disclosure also provides an electronic device 30, as shown in FIG. 2, which is a schematic diagram of an embodiment of the electronic device provided by the present disclosure. The electronic device 30 includes the following elements:

A device body 301 includes a display panel 10. The display panel includes a display region and a non-display region. The display panel further includes the following elements:

Polarizers include a first polarizer 120 and a second polarizer 121. The first polarizer 120 and the second polarizer 121 are opposite each other. The first polarizer 120 is provided with a first through hole 1201, and the second polarizer 121 is provided with a second through hole 1211. The first through hole 1201 corresponds to the second through hole 1211, and the first through hole 1201 and the second through hole 1211 are located in the non-display region.

A switchable module 302 is located between the first through hole 1201 and the second through hole 1211. The switchable module 302 includes an on state and an off state. The switchable module 302 is switchable between the on state and the off state to control light entering the display panel.

A control module 303 is configured for controlling switching of the switchable module between the on state and the off state.

A camera module 304 is disposed directly below the second through hole and configured for capturing an image in the on state of the switchable module.

In the display panel provided by the present disclosure, a switchable module is disposed at the corresponding position of the blind hole in the display panel, so that the switchable module can be turned on or off by manual control. When the switchable module is turned on or off, external ambient light can reach the lens through the blind hole or be blocked, thereby manually controlling whether the electronic device performs image capturing actions, thereby ensuring security and protecting privacy.

In some embodiments of the present disclosure, when the control module 303 is in the on state, the light from the outside may enter the camera module 304 for capturing images. In other embodiments, when the control module 303 is in the on state, the light from the outside is blocked from entering the camera module 304, thereby preventing from capturing images and protecting privacy.

In some embodiments of the present disclosure, switching of the switchable module can be controlled by inputting a password, or using an independent button, face recognition, or other methods. Specifically, the independent button is taken as an example. When the user is performing a private activity, the independent button on the terminal application, such as a mobile phone, can be operated, and the display panel receives signals from the independent button to control the electrodes located at two ends of the switchable module. The electrodes send out electrical signals, and the switchable module switches between the on state and the off state after receiving the electrical signals.

Specifically, when an user needs to perform actions, such as capturing images, the user presses an independent button disposed on a terminal, such as a mobile phone, the independent button generates a first signal and sends the first signal to a processor provided in the terminal. At this time, a processor in the terminal receives the first signal from the independent button. The first signal contains information for processing the processor, and the processor processes the first signal to determine the information contained in the first signal. The processor then sends a second signal to the control module. After the control module receives the second signal from the processor, the control module applies a voltage across the switchable module to turned on the switchable module. At this time, the light from the outside enters the display panel. The camera module completes an action, such as capturing images. When the user is performing private an activity, the user resets the independent button disposed on the terminal, such as a mobile phone. At this time, the processor in the terminal receives the first signal from the independent button. The first signal contains information for processing the processor, and the processor processes the first signal to determine the information contained in the first signal. The processor then sends a second signal to the control module. After the control module receives the second signal from the processor, the control module stops the voltage across the switchable module to turn off the switchable module. At this time, the light from the outside is prevented from entering the display panel, thereby preventing the camera module from capturing images, and protecting privacy.

In the above embodiments, the description of each embodiment has its own emphasis. For the parts not described in detail in an embodiment, refer to the detailed descriptions of other embodiments above, which are not redundantly repeated herein.

In specific implementation, each of the above units or structures may be implemented as independent entities, or any combination may be implemented as the same or several entities. For the specific implementation of the above units or structures, refer to the foregoing method embodiments, which are not redundantly repeated herein.

For specific implementation of the foregoing operations, refer to the foregoing embodiments, which are not redundantly repeated herein.

The display panel and the electronic device provided by the embodiments of the present disclosure are described in detail above. Specific examples are used herein to explain the principle and the implementation of the present disclosure. The descriptions of the above embodiments are only used to help understand the method and the core ideas of the present disclosure. Moreover, for those skilled in the art, in accordance with the idea of the present disclosure, there may be variations in the specific implementation and the application scope. In summary, the content of this description should not be considered as limitations of the present disclosure.

What is claimed is:

1. A display panel comprising: a display region and a non-display region, wherein the display panel further comprises: polarizers including a first polarizer and a second polarizer, wherein the first polarizer and the second polarizer are opposite each other, and the first polarizer is provided with a first through hole, and the second polarizer is provided with a second through hole, the first through hole corresponds to the second through hole, and the first through hole and the second through hole are located in the non-display region; and a switchable module located between the first through hole and the second through hole, including an on state and an off state, and being switchable between the on state and the off state to control light entering the display panel.

2. The display panel as claimed in claim 1, wherein the display panel further comprises:

a color filter substrate disposed below the first polarizer;

an array substrate disposed on the second polarizer, and disposed opposite the color filter substrate; and a control module configured for controlling switching of the switchable module between the on state and the off state by controlling a voltage across the switchable module.

3. The display panel as claimed in claim 2, wherein the control module includes a first electrode and a second electrode, the first electrode is disposed opposite the second electrode, the first electrode is disposed on the color filter substrate, and the second electrode is disposed on the array substrate.

4. The display panel as claimed in claim 1, further comprising:

a liquid crystal region located between the first polarizer and the second polarizer, and including a first liquid crystal region and a second liquid crystal region, wherein the second liquid crystal region is surrounded by a frame adhesive, and is separated from the first liquid crystal region by the frame adhesive.

5. The display panel as claimed in claim 4, wherein the second liquid crystal region is located directly below the first through hole, and disposed to correspond to the first through hole.

6. The display panel as claimed in claim 5, wherein the switchable module is disposed in the second liquid crystal region.

7. The display panel as claimed in claim 5, wherein an area of the second liquid crystal region is greater than or equal to an area of the first through hole.

8. The display panel as claimed in claim 1, wherein the switchable module is a light scattering liquid crystal.

9. The display panel as claimed in claim 8, wherein material for the light scattering liquid crystal is mixed material of a polymer and a liquid crystal formed by photocuring.

10. The display panel as claimed in claim 1, further comprising a shielding sheet which blocks the first through hole and is movably disposed above the first through hole to control the light entering the display panel.

11. The display panel as claimed in claim 10, wherein the shielding sheet is provided with a magnetic conductive portion, a magnet is located on a side of the display panel where the first through hole is located, and the magnet is connected with the shielding sheet by attracting the magnetic conductive portion.

12. An electronic device, comprising: a device body comprising a display panel comprising: a display region and a non-display region, wherein the display panel further comprises: polarizers including a first polarizer and a second polarizer, wherein the first polarizer and the second polarizer are opposite each other, and the first polarizer is provided with a first through hole, and the second polarizer is provided with a second through hole, the first through hole corresponds to the second through hole, and the first through hole and the second through hole are located in the non-display region; a switchable module located between the first through hole and the second through hole, including an on state and an off state, and being switchable between the on state and the off state to control light entering the display panel; a control module configured for controlling switching of the switchable module between the on state and the off state; and a camera module disposed directly below the second through hole and configured for capturing an image in the on state of the switchable module.

13. The electronic device as claimed in claim 12, wherein the display panel further comprises:

a color filter substrate disposed below the first polarizer;

an array substrate disposed on the second polarizer, and disposed opposite the color filter substrate; and the control module configured for controlling switching of the switchable module between the on state and the off state by controlling a voltage across the switchable module.

14. The electronic device as claimed in claim 13, wherein the control module includes a first electrode and a second electrode, the first electrode is disposed opposite the second electrode, the first electrode is disposed on the color filter substrate, and the second electrode is disposed on the array substrate.

15. The electronic device as claimed in claim 12, further comprising:

a liquid crystal region located between the first polarizer and the second polarizer, and including a first liquid crystal region and a second liquid crystal region, wherein the second liquid crystal region is surrounded by a frame adhesive, and is separated from the first liquid crystal region by the frame adhesive.

16. The electronic device as claimed in claim 15, wherein the second liquid crystal region is located directly below the first through hole, and disposed to correspond to the first through hole.

17. The electronic device as claimed in claim 16, wherein the switchable module is disposed in the second liquid crystal region.

18. The electronic device as claimed in claim 16, wherein an area of the second liquid crystal region is greater than or equal to an area of the first through hole.

19. The electronic device as claimed in claim 12, wherein the switchable module is a light-scattering liquid crystal.

20. The electronic device as claimed in claim 19, wherein material for the light-scattering liquid crystal is mixed material of a polymer and a liquid crystal formed by photocuring.

* * * * *